HIGH SPEED MEMORY BISTABLE DYNATRON CIRCUIT

Filed Jan. 31, 1961 3 Sheets-Sheet 1

INVENTORS: Kazuo Husimi
Tsuneori Koshiba

ATTORNEYS: Watson, Cole, Grindle & Watson

HIGH SPEED MEMORY BISTABLE DYNATRON CIRCUIT

Filed Jan. 31, 1961 3 Sheets-Sheet 2

INVENTORS: Kazuo Husimi
Tsuneori Koshiba

ATTORNEYS:
Watson, Cole, Grindle & Watson

HIGH SPEED MEMORY BISTABLE DYNATRON CIRCUIT

Filed Jan. 31, 1961 3 Sheets-Sheet 3

INVENTORS: Kazuo Husimi
Tsuneori Koshiba

ATTORNEYS:
Watson, Cole, Grindle & Watson

United States Patent Office 3,198,957

Patented Aug. 3, 1965

3,198,957

HIGH SPEED MEMORY BISTABLE DYNATRON CIRCUIT

Kazuo Husimi and Tsuneori Koshiba, Tokyo, Japan, assignors to Nippon Telegraph and Telephone Public Corporation, Tokyo, Japan, a public corporation of Japan Filed Jan. 31, 1961, Ser. No. 86,134
Claims priority, application Japan, Feb. 15, 1960, 35/4,397, 35/4,398
5 Claims. (Cl. 307—88.5)

This invention relates to a high speed memory unit and more particularly to a bistable dynatron circuit.

According to the present invention, one bit of an information memory unit is stored in a circuit network in which two negative resistance elements having dynatron characteristics are connected homopolarly in series, i.e., in series aiding relationship, and between their junction point and ground are connected RC parallel elements or LC parallel elements and a coupling resistance in series.

An object of the present invention is to provide a stable and very high speed memory element.

Figure 1:
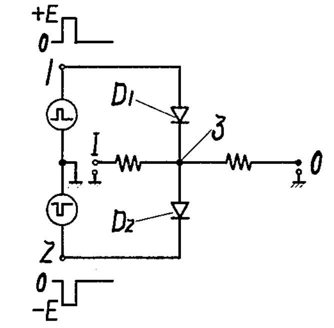
FIGURE 1 is an explanatory view of the principle of pair diodes in which two negative resistance elements having dynatron characteristics are connected.
Figure 2:
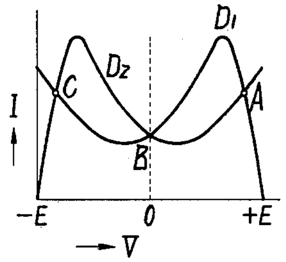
FIGURE 2 is a curve diagram showing the relation between the potential of the junction of two similarly poled series diodes and the electric current flowing through them.

Assume that a circuit is made in which two negative resistance elements have exactly the same dynatron characteristics, for example, Esaki diodes. Also assume with reference to FIGURE 1 that positive pulses and negative pulses are fed synchronously from the terminals 1 and 2, respectively, as shown in FIGURE 1. When these exciting pulses are applied, operation stabilizing points intersecting at three points A, B and C will appear in both diodes $D_1$ and $D_2$, as shown in FIGURE 2. Of them, the point B will be an unstable point and the points A and C will be stable points. Whether the operation is to be stabilized at the point A or C will be determined by the polarity of the slight direct current control voltage applied to the input terminal before said exciting pulses are applied. That is to say, if a signal current is flowing from the control input terminal I toward junction 3, the Esaki diode $D_2$ in FIGURE 1 will switch to a high potential state before $D_1$ and therefore the point A in FIGURE 2 will be a stable point. On the contrary, if the control signal current is flowing from junction 3 to the input terminal I, the Esaki diode $D_1$ will switch to high potential state before $D_2$ and the point C will be a stable point. Depending upon the state, A or C, the voltage appearing at the output terminal 0 in FIGURE 1 will take a positive or negative value, respectively. It is already known that, if the state of the point A is made to correspond to a binary number "1" and the state of the point C to a binary number "0," these pair diodes will constitute a logic circuit. (See IRE Transaction, EC–9, March 1, 1960, pages 25 to 29, E. Goto et al.: Esaki Diode High Speed Logical Circuit.) During the time positive and negative exciting voltage are applied, the potential of junction point 3 in FIGURE 1 is held in state A or C, and a binary number is stored. However, if the positive or negative pulses exciting voltages are turned off, the potential at the joint point 3 will return to a zero potential. Therefore, the stored information will be lost.

According to the present invention, a reactance element which is an energy accumulating element is connected to junction point 3 so that, even in case the on-off exciting pulses are turned off, the stored information may be held temporarily and the memory action will be thereby carried out.

The case of utilizing RC parallel circuits for the reactance element shall be first explained. In this case, too, the binary numbers "1" and "0" are made to correspond to the positive or negative potential of the junction point 3.

Figure 3:
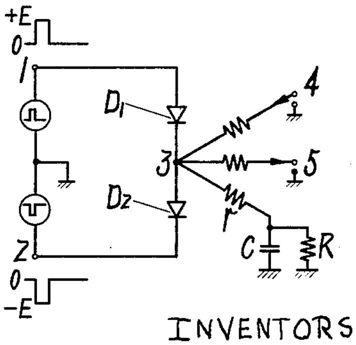
FIGURE 3 is a circuit diagram showing an embodiment of the present invention using RC parallel circuit elements in the memory element.

According to the embodiment of this invention shown in FIGURE 3, a memory circuit network is provided with two negative resistance elements having dynatron characteristics connected in series aiding and between their junction point 3 and ground are inserted parallel elements RC with a coupling resistance *r* in series. Positive exciting clock pulses are applied to terminal 1, and negative exciting clock pulses are applied to terminal 2 as shown in FIGURE 3. A write-in signal is applied to a terminal 4 and a read-out signal is obtained from terminal 5. If it is assumed that a write-in signal is applied and that a control potential is applied in advance to terminal 4, a current flows toward junction point 3. Since positive clock pulses are applied to terminal 1 and negative clock pulses are applied to terminal 2, as shown by #1 in FIGURE 4 (I) (*a*) and (*b*), the potential of the junction point 3 will be controlled by the input signal applied to terminal 4 and a positive output voltage will appear. This voltage will pass through the resistance *r* in FIGURE 3 and will charge the condenser C of RC to a positive potential. When the exciting pulses applied to terminals 1 and 2 in FIGURE 3 are turned off, the potential of the junction point 3 will tend to return to the zero potential but the electric charge of the condenser will discharge through the resistances R and *r* which are connected in parallel with respect to condenser C. At this time, if the #2 in FIGURE 4 (I) are applied even when there is no more input from the terminal 4 in FIGURE 3, the potential of the junction point 3 will be again driven positive by the discharge current from condenser C flowing to junction point 3 through the resistance *r* as shown at *2 in FIGURE 4. That is to say, if the signal current flows into junction point 3 from the terminal 4 in FIGURE 3, the potential of the junction point 3 is stabilized in a positive potential, thereafter, even if no input signal comes in from the terminal 4, the potential of the junction point 3 will be held positive by the discharge current of the condenser C. If, however, the signal current applied to terminal 4 flows away from junction point 3 the information i.e. the potential of the junction point 3 will be held negative by the discharge current of the condenser C. If the time constant of RC is made larger, the information memory action will become larger. On the contrary, if it is made smaller, the information memory action will become smaller. When the information memory action is too small, the information will be lost before the next clock pulse is applied. If the time constant of RC is too large, the input signal to be applied to the terminal 4 will be required to have a large signal level for writing new information. If the time constant of RC is comparable to T, the period of the exciting pulses, this circuit will have a function of a dynamic memory unit.

The writing operation of this device will now be explained. If the writing is to be carried out with the clock pulse of #3 in FIGURE 4 (I), the write-in signal will be applied to terminal 4 of the memory device as is shown by the broken line *3 in FIGURE 4 (II). The output wave form will correspond to the clock pulse #3, i.e., a negative output will appear at terminal 5 as shown a *4 in FIGURE 4 (II) and thereafter the stored information will be retained by the cooperation of clock pulses and reactance element C.

Figure 4:
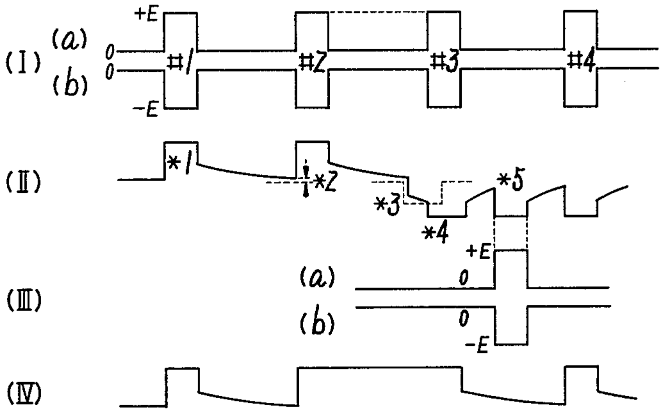
FIGURE 4 shows wave forms for explaining the operation of the embodiment shown in FIGURE 3.

For the inhibition of writing, a non-stationary exciting pulse having a duration between the period of #2 and #3 as shown in dotted line in FIGURE 4 (I), will be used. Even if a write-in signal is impressed to the junction point 3 in FIGURE 3 in the same manner as the one which is to be received when writing, the relatively long exciting pulse will control the potential of junction point 3 in FIGURE 3 and this memory unit will not be disturbed by the writer-in signal. The output wave forms in this case are shown in FIGURE 4 (IV). That is to say, by such operation, only the memory unit which has not been selected will be able to inhibit writing.

As explained above in detail the method of address selection for writing can be performed by impressing the relatively short duration clock pulse on the exciting terminals of the unit which is to be written in and by impressing the relatively long duration pulse on the exciting terminal of the unit which is not to be written.

The case of reading the stored information shall now be explained. In the case of reading, when a relatively short duration pulse, as shown in FIGURE 4 (III) (*a*) is applied to terminal 1 of the memory unit of the selected address and a pulse in FIGURE 4 (III) (*b*) of the opposite polarity is applied to terminal 2, the output wave form will give an output signal of the same polarity as the stored information as shown in *5 in FIGURE 4 (II). Even after the reading, the stored information will be retained by the generative action of clock pulse of #4. That is to say, the non-destructive reading can be carried out.

Figure 5:
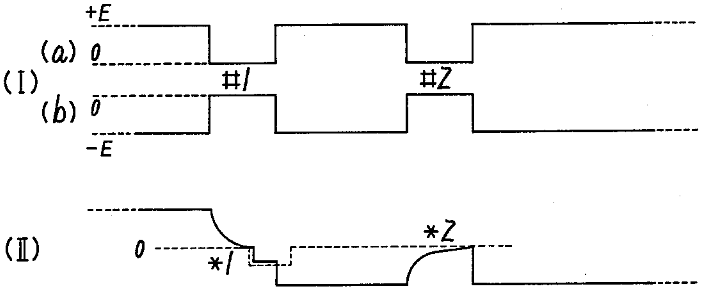
FIGURE 5 shows wave forms in a special case where the operation of the embodiment shown in FIGURE 3 is simplified.

FIGURE 5 shows the operation wave forms which are simplified with respect to the operation shown in FIGURE 4. In this case, the holding direct current potential is impressed to terminals 1 and 2 of the memory unit, as shown in FIGURE 5 (I) (*a*) and (*b*), instead of the exciting clock pulses as shown in FIGURE 4 (I), and the written information will be held during the impression of the holding direct potential. In writing, the holding direct current potential will be decreased to a low potential which is not sufficient to sustain stored information as shown at #1 in FIGURE 5 (I). After the application of the writing pulse to terminal 4, the holding voltages at terminals 1 and 2 will recover to their initial value, and junction point 3 in FIGURE 3 will be established to a positive or negative value in accordance with the polarity of the writing signal as shown at *1 in FIGURE 5 (II) and will be held thereafter.

In reading, all the memory units which have received no address selection will release the holding direct current potential by the reading inhibit pulse as shown by #2 in FIGURE 5 (I). In this case, the junction point of 3 in FIGURE 3 will decay to a small value as shown in *2 in FIGURE 5 (II), because the holding potential of the memory element is removed, therefore, no output signal will be obtained. If the holding potential is recovered again, the stored information will be maintained as it is before reading by the small residual potential of the RC circuit.

Figure 6:
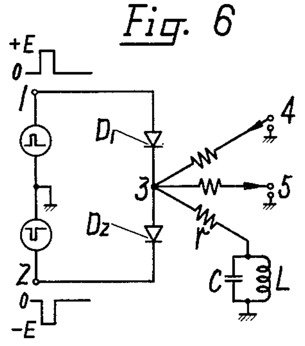
FIGURE 6 is a circuit diagram showing a further embodiment in which LC parallel circuit elements are used in the memory element according to the present invention.

The further information memory network embodiment made of a circuit in which two negative resistance elements having dynatron characteristics are connected in series aiding, having inserted between their junction point and ground LC parallel elements and a coupling resistance in series will now be explained with reference to FIGURE 6. The parallel circuit elements consisting of LC are connected from junction point 3 to the ground through a series coupling resistance *r*. Clock pulses of the positive polarity are inserted at terminal 1 and clock pulses of the negative polarity are inserted at terminal 2. As explained with reference to FIGURE 3, a write-in signal is applied to terminal 4 and the read-out signal obtained from the terminal 5.

Figure 7:
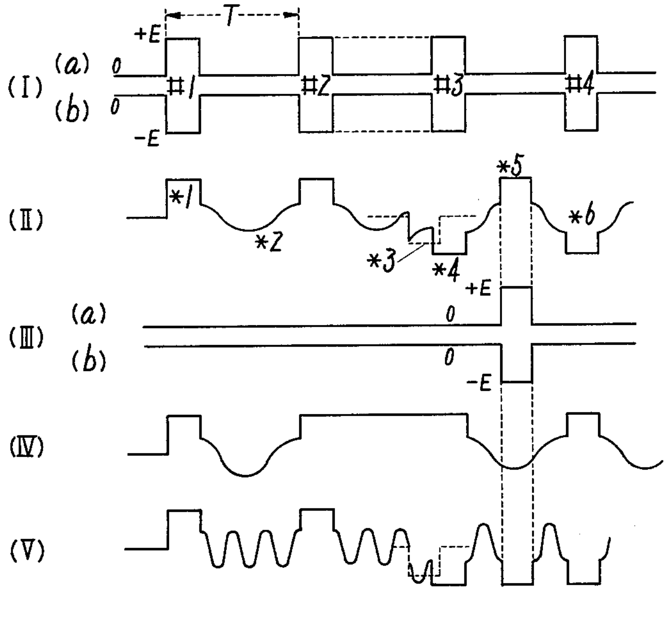
FIGURE 7 shows wave form for explaining the operation of the embodiment shown in FIGURE 6.

Now it shall be assumed that clock pulses of the positive polarity of a cycle time T shown in FIGURE 7(I)(*a*) are applied to terminal 1, that clock pulses of negative polarity as shown in FIGURE 7(I)(*b*) are applied to terminal 2 and that, with the clock pulse of #1, the potential of the junction point 3 gives an output of the positive polarity as shown by *1 in FIGURE 7(II). If the resonance frequency of LC is selected to be about $1/T$, where T is the period of one clock cycle as indicated in FIGURE 7(I)(*a*) and if no signal is applied to terminal 4, such wave forms as *2 in FIGURE 7(II) will appear on the junction point 3 of the negative resistance elements $D_1$ and $D_2$ through the coupling resistance *r* from the LC circuit and therefore an output of positive polarity will be obtained from the clock pulse #2. Therefore, it is evident that, if such relationship is maintained between the clock pulse and the resonance frequency of LC, the circuit of FIGURE 6 will function as a dynamic memory network.

The method of writing in the above-mentioned memory unit shall now be explained. As already explained with reference to FIGURE 4, in writing with the clock pulse of #3 in FIGURE 7(I), a write-in control signal will be applied to terminal 4 of the memory unit as shown by the broken line of *3 in FIGURE 7(II). The output waveform corresponding in time to the clock pulse #3 will have a polarity depending upon the polarity of the write-in signal *3. Thereafter, the stored information will be maintained by the clock pulses.

To inhibit writing, a relatively wide pulse having a duration for the period between #2 and #3, as shown in dotted line in FIGURE 7(I), will be used. Even if a write-in signal is applied to the junction point 3 in FIGURE 6 in the same manner as the one which is to be received writing, the non-stationary exciting pulse will hold the potential of junction point 3 in FIGURE 6 and this memory unit will be undisturbed by the write-in signal. The output wave forms in this case are as shown in FIGURE 7(IV). That is to say, by such operation, only the memory unit which has not been selected will be able to inhibit writing.

Now the method of reading information stored in this unit will be explained. A positive reading pulse is applied to the terminal 1 in FIGURE 6 and a negative pulse to the terminal 2 at about the center of the period between exciting clock pulses, i.e., they have $T/2$ delay time from #3 as shown in FIGURE 7(III)(*a*) and (*b*), the read-out signal with an opposite polarity to that of the stored information as in *5 in FIGURE 7(II) will appear at the junction point 3 of FIGURE 6. Because at the moment that the reading pulse (III)(*a*) and (*b*) is applied, the junction point of 3 in FIGURE 6 will be slightly positive with the free oscillation of LC circuit by action of the #3 clock pulse. If the polarity of this read out signal is required to be reversed, this can be performed by using an inverter such as a "NOT" circuit.

This behavior by which the read-out signal is obtained with a pulse of opposite polarity of the stored information is a difference from the embodiment shown in FIGURE 3. However, even after the reading, the stored information will not be destroyed, as shown by *6 in FIGURE 7(II). Because, at the moment that the exciting clock pulse #4 is applied, the junction point of 3 in FIGURE 6 will be slightly negative with the free oscillation of LC circuit caused by excitation of the reading pulse.

FIGURE 7(V) shows wave forms for explaining another operation of this unit, in which the resonance frequency of LC is taken to be about $3/T$, where T is the period of one clock pulse cycle, in order to provide a read out signal with a pulse of the same polarity as the stored information.

What is claimed:

1. A high speed memory network comprising a first and a second pulse source, each having a pair of output terminals, one of each of said pair of output terminals being connected to a point of reference potential, a pair of homopolarly serially connected negative resistance elements having dynatron characteristics connected together at a junction and each connected respectively to the other terminal of each of said pair of output terminals of said pulse sources, control signal means for applying a control signal to the junction of said negative resistance elements, output means connected to said junction and energy storage means including a capacitor connected between said junction and said point of reference potential to store the control signal for retention by periodic generative action of pulses from said pulse sources for random read out at any time.

2. A network according to claim 1, wherein said energy storage means including a capacitor comprises a parallel connected resistance-capacitance circuit and a coupling resistance connecting said resistance-capacitance circuit to said junction.

3. A network according to claim 1, wherein said energy storage means including a capacitor comprises an inductance and a capacitance connected in parallel.

4. A network according to claim 3, wherein said inductance-capacitance circuit has a frequency $1/T$ where T is the period of one cycle of the pulses from said pulse sources.

5. A network according to claim 3, wherein said inductance-capacitance circuit has a frequency of about $3/T$, where T is the period of said pulse sources.

References Cited by the Examiner

UNITED STATES PATENTS

| | | | |
|---|---|---|---|
| 2,614,140 | 10/52 | Kreer | 307—88.5 |
| 2,986,724 | 5/61 | Jaeger | 331—115 |
| 3,138,723 | 6/64 | Goto | 307—88.5 |

OTHER REFERENCES

Electronics, pages 103 to 107, June 24, 1960. "Tunnel Diode Logic Circuits" by W. F. Chow.

IRE Transactions on Electronic Computers, March 1960. "Esaki Diode High-Speed Logical Circuits" by E. Goto et al., pages 25 to 29.

ARTHUR GAUSS, *Primary Examiner.*

GEORGE N. WESTBY, *Examiner.*